United States Patent

Beausoleil

[15] 3,644,902

[45] Feb. 22, 1972

[54] MEMORY WITH RECONFIGURATION TO AVOID UNCORRECTABLE ERRORS

[72] Inventor: William F. Beausoleil, Poughkeepsie, N.Y.

[73] Assignee: International Business Machines Corporation, Armonk, N.Y.

[22] Filed: May 18, 1970

[21] Appl. No.: 38,220

[52] U.S. Cl. ................340/173 R, 340/146.1 R, 340/174 ED
[51] Int. Cl. ..........................................................G06f 13/00
[58] Field of Search .................340/146.1 R, 173 R, 174 ED, 340/172.5 R; 324/73 PC; 235/153

[56] References Cited

OTHER PUBLICATIONS

M. Lehman, " Variable Memory Structure" in IBM Tech. Disc. Bull. (9)9: Feb., 1971 pp. 1180–1181.

*Primary Examiner*—Eugene G. Botz
*Assistant Examiner*—R. Stephen Dildine, Jr.
*Attorney*—Hanifin and Jancin and William S. Robertson

[57] ABSTRACT

A memory having circuits for correcting single errors in a word read from the memory is provided with means to reconfigure the memory so that a configuration having a double, uncorrectable, error is changed to a configuration having two single, correctable errors. In one embodiment, interchanging plug-in components for two or more bit positions produces a new configuration; in another embodiment, the wiring to the plug-in components is easily changeable.

10 Claims, 1 Drawing Figure

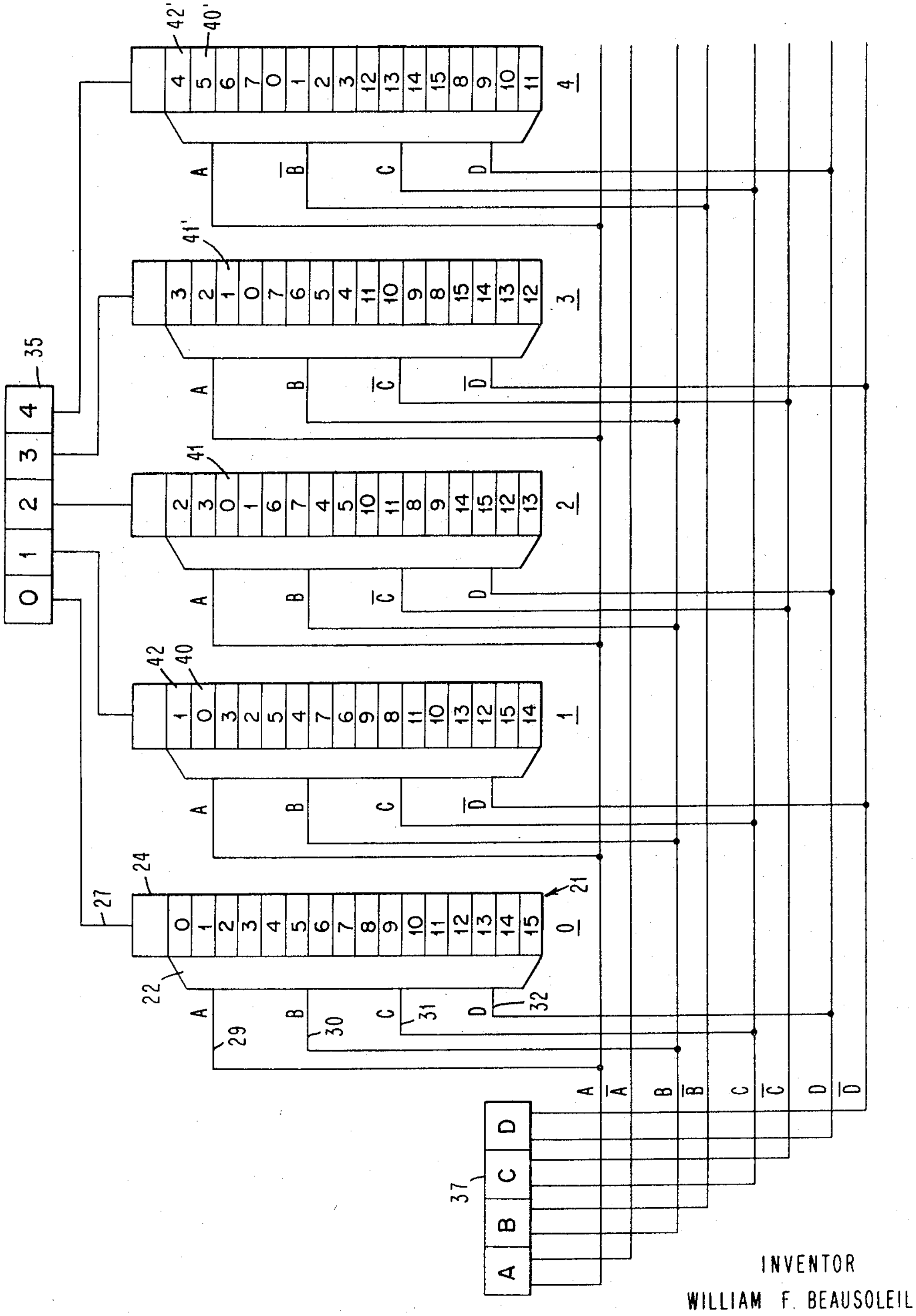
INVENTOR
WILLIAM F. BEAUSOLEIL
BY W. S. Robertson
ATTORNEY

MEMORY WITH RECONFIGURATION TO AVOID UNCORRECTABLE ERRORS

INTRODUCTION

It will be helpful to review the terminology that distinguishes the data content of a memory from the corresponding data storing components of the memory. For example, for a particular "word" of data that is stored in the memory, there is a corresponding group of components that make up a "work location." For most purposes, a word and its word location are independent in the sense that the word can be stored in various locations by ordinary read and write operations of the memory.

The elemental unit of storage in a memory is a "storage cell" that holds one bit of information. As an example, a cell may comprise a semiconductor flip-flop and associated components. A memory can be thought of as a row and column arrangement of storage cells. Cells of the same row make up a word location and they are connected to addressing circuits that address a particular word location for a memory operation. Addressing circuits usually comprise an address register, driver circuits, a decoder, and selection wires. The selection wires carry power from the driver circuits to a word location that is selected by the decoder in response to the address held in the address register (or power is supplied to a group of word locations where further addressing takes place.) Thus, the addressing circuits establish the relationship of a storage cell and a particular word location.

Along the columns, the cells are interconnected by bit-sense wires to bit drivers, sense circuits, and a data register which are collectively called "bit circuits." The relationship between the column connections and a particular bit position in the data register identifies the column components as belonging to a particular bit position of the memory.

Some memories are physically arranged, or "packaged" in a simple row and column arrangement just described. More commonly, there are many storage cells for each bit position and these storage cells are arranged in a row and column array. It is important for understanding this invention to distinguish between the address location of the storage cell, which has been described in terms of the row and column arrangement, and the physical location of storage cells in the memory package. It is a feature of this invention that this relationship can be easily and advantageously changed.

It will be helpful to introduce the specific terminology of the packaging of one monolithic semiconductor memory with which this invention is useful. In this memory, an array of transistor flip-flops and associated addressing circuits and bit circuits are formed on a silicon chip. Chips are mounted on ceramic modules which have their terminals soldered into circuit cards. A circuit card forms a bit position of the memory, and a memory has a large number of identical and interchangeable cards. Circuit cards are removably plugged into circuit boards which carry additional wiring of the memory addressing circuit. From a more general standpoint, the card in such an arrangement is a modular, easily replaceable, unit of the memory package that is related to a particular bit position of the memory or, at most, to a few bit positions of the memory.

Some memories, or the associated systems, have circuits for encoding data to be stored in the memory for correcting single errors in a memory word and detecting double errors in a word. For example, 64 data bits can be encoded to form eight check bits which are stored in the same word location of the memory as the 64 data bits. A failure in any single one of the 72 cells can be corrected by the error correcting circuits. With these error correcting codes, double errors can be detected as existing in a word but they cannot be corrected by the error correction circuits; that is, the defective bit positions can not be identified. Error correction codes are also known which correct special kinds of double errors, for example, errors in adjacent bit positions; such codes are particularly useful when two or more bit positions are packaged on a replaceable unit, but such codes do not correct all double errors that occur in other patterns.

To generalize, in an error correction system words or other units of data are encoded, errors in a limited number of positions of an encoded unit of data are correctable automatically, and a larger number of errors is ordinarily detectable by the error correction circuits or by other means. Thus, a memory with only a few bad bit positions can be inoperable and require card replacement. An object of this invention is to provide a new and improved method and apparatus for continuing operation without replacing defective cards.

THE INVENTION

In the memory of this invention, a standard, interchangeable, card forms a bit position (or a few bit positions) of a memory and the cards are plugged into a circuit board that provides addressing interconnections, as is conventional. The addressing connections to each card (or group of cards) is made unique so that the relationship between a word location and a package position differs between cards. With this arrangement, interchanging the cards for two bit positions produces a new configuration of storage cells in which pairs of cells that form a double error in the original configuration form single, correctable, errors in the new configuration.

This invention has the advantage that little or no additional hardware is needed, since the interconnections between bit positions exist in conventional memories. The invention can be applied to many conventional memories, either permanently or as a temporary repair, by transposing addressing wires on the circuit board. The number of spare storage cards kept on hand by a memory user or by service personnel can be reduced significantly. Replacement of faulty cards can be postponed until scheduled maintenance. Replacement can even be postponed until so many failures have occurred that no possible interchanging of cards can avoid double errors. Thus, the invention will improve the operation of a data processing system and will reduce the cost of operation.

THE DRAWING

The single FIGURE in the drawing shows a schematic of a memory and the preferred embodiment of the invention.

DETAILED DESCRIPTION

CONVENTIONAL FEATURES

The drawing shows five replacable memory cards, each identified as to its bit position by a decimal number 0 through 4. The cards are identical and interchangeable. Each card comprises an array of storage cells 21, an address decoder 22, and bit-sense circuits 24. A line 27 from each bit-sense circuit 24 connects a card to the correspondingly numbered position of a data register 35. Lines 29, 30, 31 and 32 connect each address decoder to an address register 37.

Each array 21 is illustrated as a column of 16 numbered blocks, one of which is to be addressed during a memory operation. In the preferred memory, the storage cells of an array 21 are arranged in a matrix of 16 rows, as the drawing represents, and eight columns. A three-bit address decoder included in bit-sense circuit 24 selects signals from one of the eight columns during a read operation and transmits signals from register 35 to the addressed one of the eight columns during a write operation. The numbered blocks in array 21 will be referred to as cells, but they equivalently represent a row of storage cells addressed by decoder 22 and further addressed by circuit 24 and this form of addressing will be discussed again later.

In addition to containing the address decoder already introduced, the bit-sense circuit 24 contains conventional sensing and bit driver circuits.

Decimal numbers in the blocks of array 21 correspond to the binary number held in address register 37 for selecting the storage cell. For example, when positions A, B, C and D in register 37 are respectively 1110, or decimal 14, the storage cells numbered 14 are selected by decoder 22.

Bit position 1 illustrates features of conventional decoder operations that are important to understand before looking at the more specific features of this invention. In this conventional arrangement, the word location and the package location can each be identified by the number sequence 0 through 15. (In the later description, the numbers identify the word location and not the package location.) The four inputs to decoder 22 of bit position 0 are lettered A, B, C, and D corresponding to letters in the four-bit positions of address register 37. An address decoder can be thought of as a tree interconnection of single pole, double throw, switches that branch from a single power node to the 16 selection wires of array 21. At the power node, a single switch is responsive to the A position of register 37. When A equals 0, the A switch selects the upper of the two switch terminals which leads through B, C, and D switches to a selection wire for the upper half of the array. Similarly, the addressed cell is defined as being in the lower half of the array when addressed bit A is a 1. Two switches are responsive to the B bit of register 37, one for each output terminal of the A switch. Each B switch selects the high order or low order of four storage cells in the group of eight cells selected by the eight address bit. In the example in which the address is 1110, the A, and B switches establish that the addressed cell is in the group 12, 13, 14, and 15. Similarly, in the example, the C bit of register 37 controls a set of four switches that establish that the addressed cell is in the group 14, 15, and the D switch selects cell 14. Once the operation of the decoder is understood, it will be simpler to consider that the decimal number of the cell in an array 21 corresponds to the binary number in address register 37 and that changing one or more bits in the address register causes corresponding changes from one decimal numbered cell to another. This invention makes use of the fact that transposing address wires or selection wires has the same effect.

The memory or the data processing system associated with the memory encodes words to be stored in the memory and supplies both data bits and check bits to the data register. The encoding circuits also correct single errors and detect double errors in a word read from the memory and stored in the data register. These circuits and their operation are well known.

INTRODUCTION TO THE INVENTION

In the embodiment of the invention shown in the drawing, the circuit board is wired to provide the true and complement value of each address bit as the symbols A, $\overline{A}$, etc., on the wires represent. The connections to the 4 terminals of each card are arranged in a pattern that is unique for each bit position. The following more specific description of the preferred embodiment and other embodiments will describe the effect of address skewing on the memory configuration, the operation to correct double errors, and packaging arrangements that are suitable for the memory of the drawing and variations on the memory of the drawing for other packaging arrangements.

ADDRESS SKEWING AND RECONFIGURATION

As has already been explained, bit position 0 represents the conventional arrangement in which the sequence of addresses, 0000, 0001, 0010, 0011..., and the corresponding decimal sequence of word locations corresponds directly to the physical order of the storage cells. In bit position 1, the low order address bit, D, is inverted. Thus, the numerical sequence of addresses is transformed to the sequence 0001, 0000, 0011, 0010..., which corresponds to the decimal sequence 1, 0, 3, 2..., shown in bit position 1. In other words, the address 1110 selects in bit position 0, the storage cell which is in word location 14 and package position 14; in bit position 1, this address is transformed to 1111 and thus selects the cell in the package location 15. The addressed cell in bit position 1 is in word location 14 because the word location is established by the addressing circuit and is independent of the package position.

For an equivalent explanation of the effect of inverting only the D bit of the address, consider that the eight D switches of the decoder for bit position 1 point up to an even numbered word location when the D switches of the decoder for bit position 0 point down to an odd numbered word location and vice versa. Bit position 2 illustrates the effect of inverting only bit C of the address. Thus, the address sequence 0000, 0001, 0010, 0011..., becomes 0010, 0011, 0000, 0001..., as the decimal sequence 2, 3, 0, 1 shows.

Bit position 3 shows the effect of inverting two bits, C and D. Thus, address 0000 becomes 0011, address 0001 becomes 0010, address 0010 becomes 0001, etc., to produce the sequence of word locations 3, 2, 1, 0, 7.

Similarly, in bit position 4, inverting the C address bit produces the binary sequence 0010, 0101, 0110, 0111, 0000..., which is represented in the array by the decimal sequence 4, 5, 6, 7, 0.

From these examples it should be evident that unique patterns of the true and complement values of the address bits produce a configuration in which no row has two cells in the same word location. In the example of the drawing, the pattern of complements follows a simple binary counting sequence (ABCD, ABC$\overline{D}$, AB$\overline{CD}$, etc.); thus, it is evident that the number of unique patterns of address bits equals the number of words that are addressed. Since memories ordinarily have many more words than bit positions, address skewing can be used with most memories. It should also be apparent that no particular sequence of patterns is necessary.

OPERATION WITH DOUBLE ERRORS

Suppose that the storage cells in package position 40 of bit position 1 and in package position 41 of bit position 2 have become defective. Since both of the defective cells are in word location 0, word location 0 has an uncorrectable error. When word location 0 is addressed for a read operation, conventional error correction circuits, not shown in the drawing, signal that an uncorrectable error has occurred, and by conventional techniques service personnel can locate the error as being in word location 0 in the cards for bit positions 1 and 2. Service personnel might then choose to interchange the units for positions 2 and 3. In the new arrangement the defective cell of the card originally in bit position 2 appears in bit position 3 at package location 41′. Position 41′ is of course the same package position in the array as position 41 in the original configuration since nothing on the replaceable unit is changed. In the new configuration, position 41′ is part of word location 1. Thus, in the new configuration, word location 0 and 1 have single correctable errors and the memory can now operate satisfactorily.

Suppose that in the example, the memory also contained an error in package position 42 of bit position 1 which in the original configuration produces a correctable single error in word location 1. The operation of interchanging cards of bit positions 2 and 3 would give word location 0 a correctable single error in package position 40 as just described, but it would leave word location 1 with two errors, in positions 41′ and 42. Some additional change would be made; for example, the cards for positions 1 and 4 could be interchanged to produce single errors in bit position 3 of word location 1 (package position 41′), bit position 4 of word location 4 (package position 42′), and bit position 4 of word location 5 (package position 40′).

Even the five array cards of the memory of the drawing provide 120 different configurations, a more common memory has a longer word length in which there are many configurations. Thus, random interchanging of cards is likely to provide an operable configuration.

The operation just described is useful when more than two errors occur in a word location except that the error correction circuits may not identify the defective word location. Various other error correction techniques are of course well known for locating such errors. Certain situations, such as failure of the card or cards of an entire bit position, may make errors uncorrectable except by card replacement.

PACKAGING AND OTHER EMBODIMENTS

The memory of the drawing illustrates various packaging arrangements. The address register 37 and/or the data register 35 may operate for the entire memory, as the drawing shows, or individual registers may be provided for each chip or card. The terms "card" and "board" have been used describing a specific memory, but from a more general standpoint, the cards are modular, easily replaceable, array units and the board is a packaging unit that is common to several such array units.

It is known to provide more than one card for a bit position to increase the size of the memory; such cards can be provided with identical address inputs or with skewed address inputs. Certain simple error correction codes correct multiple adjacent errors and with such a code, several bit positions can be packaged on a card and operate with the same pattern of address bits. Very limited skewing may also be useful; as the examples have shown, interchanging two cards will correct the memory if there are not too many errors. Thus, a memory with only a few different addressing arrangements will provide many of the advantages of the preferred embodiment.

Preferably, each card has an individual address decoder so that the failure of a decoder produces only a single, correctable, error. The invention is also useful with memories having a decoder that operates many or all of the bit positions through the selection wires. The selection wires are transposed between bit positions (or groups of bit positions) according to the pattern illustrated by the word location numbers in the drawing.

The drawing shows the transpositions made in a few of the address lines and not in the address lines that are associated with the column addressing circuits. By similarly transposing the column selection circuits, the embodiment of the invention shown in the drawing could be extended to a memory having more than 16 bit positions. As has already been explained, a few transpositions provide a large number of memory configurations and it is not necessary to have a unique addressing arrangement for each bit position.

From a more general standpoint, the wiring transpositions provide logic functions of the address bits, and various logic circuits can advantageously be used to perform the transpositions or to permit easily changing the configuration for testing or for error free operation with or without changing cards. For example, a logic gate connected between the register 37 and the eight address wires provides in a limited case of inverting a single address line, two patterns, and in a general case with the gates separately controlled for each line will provide an additional variety of patterns.

From the description of a preferred memory and the suggestions for other embodiments of the invention, those skilled in the art will recognize a wide variety of applications for this invention and corresponding variations in the disclosed embodiments within the spirit of the invention and the scope of the claims.

What is claimed is:

1. A memory comprising, interchangeable modular units of storage cells, the cells of each of said units being associated with particular bit positions of the memory such that a memory word is formed of storage cells in a plurality of units, means providing a multibit address for selecting a word location in said units for a memory operation, and means providing a plurality of unique logic functions of said address to said units for defining as a word location, cells differently located in said units having different logic functions of said address, whereby interchanging said units having different functions of said address provides a reconfiguration of the storage cells forming said word locations.

2. A memory of the type having storage cells packaged in replaceable units, means for correcting a limited number of errors in a word location without replacing a unit, means for detecting but not correcting a greater number of errors in a word location, and means connected to each said replaceable unit for supplying signals to select storage cells forming a word location, wherein the improvement comprises, means providing a unique address relationship between a plurality of said replaceable units and said signals, whereby interchanging a unit having a defective storage cell in a word location having detectable but uncorrectable errors with another unit of the memory having a different address relationship produces a reconfiguration of the storage cells in a plurality of word locations for changing uncorrectable multiple errors to correctable errors.

3. The memory of claim 2 in which said means providing a unique addressing relationship comprises components of the memory addressing circuit differently connected at said plurality of replaceable units.

4. The memory of claim 2 in which said addressing components represent fewer than all of the addressing bits of said address.

5. The memory of claim 2 in which said addressing circuit components are wires carrying the true and complement values of selected bits of an address.

6. The memory of claim 5 in which said wires are connected in different permutations at each bit position.

7. A method of correcting multiple errors in a memory having error correction circuits, storage cell arrays for each bit position, and a common packaging unit carrying wires between each said array and an address register, comprising, locating defective cells in the array, and changing said wires in said common packaging unit to locate each said error in a separate word location of the memory.

8. A memory comprising, storage cells arranged to form bit positions of the memory, means providing a multibit address for selecting a word location of the memory, an address circuit interconnecting said bit positions in a configuration for a plurality of said bit positions to have storage cells of a word location differently positioned, and logic means in the addressing circuit connections to said bit positions to provide a selected logic function of said address to said bit positions.

9. The memory of claim 8 further including means for encoding a word to be stored in the memory in an error correction code and for decoding words read from the memory for correcting single bit errors and detecting double bit errors.

10. The memory of claim 9 wherein said address circuit comprises an address register for holding said address, an address decoder for each of said bit positions, and means connected between said address register and said address decoders for inverting selected bits of said address to form said selected logic functions, whereby changing said logic functions reconfigures the storage cells for a word location for converting uncorrectable double bit errors into correctable single bit errors.

* * * * *